(12) United States Patent
Venkatesan et al.

(10) Patent No.: US 7,770,014 B2
(45) Date of Patent: Aug. 3, 2010

(54) RANDOMIZED SIGNAL TRANSFORMS AND THEIR APPLICATIONS

(75) Inventors: Ramarathnam Venkatesan, Redmond, WA (US); Michael T. Malkin, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 893 days.

(21) Appl. No.: 10/837,563

(22) Filed: Apr. 30, 2004

(65) Prior Publication Data
US 2005/0257060 A1    Nov. 17, 2005

(51) Int. Cl.
*H04L 9/32*    (2006.01)
(52) U.S. Cl. .................................. 713/176; 380/268
(58) Field of Classification Search .................. 713/176
See application file for complete search history.

(56) References Cited

U.S. PATENT DOCUMENTS

| | | |
|---|---|---|
| 4,773,039 A | 9/1988 | Zamora |
| 5,093,869 A | 3/1992 | Alves et al. |
| 5,210,820 A | 5/1993 | Kenyon |
| 5,351,310 A | 9/1994 | Califano et al. |
| 5,425,081 A | 6/1995 | Gordon et al. |
| 5,465,353 A | 11/1995 | Hull et al. |
| 5,490,516 A | 2/1996 | Hutson |
| 5,535,020 A | 7/1996 | Ulichney |
| 5,613,004 A | 3/1997 | Cooperman et al. |
| 5,664,016 A | 9/1997 | Preneel et al. |
| 5,687,236 A | 11/1997 | Moskowitz et al. |
| 5,689,639 A | 11/1997 | Schwarz |
| 5,734,432 A | 3/1998 | Netravali et al. |
| 5,774,588 A | 6/1998 | Li |
| 5,802,518 A | 9/1998 | Karaev et al. |
| 5,809,498 A | 9/1998 | Lopresti et al. |
| 5,835,099 A | 11/1998 | Marimont |
| 5,862,260 A | 1/1999 | Rhoads |
| 5,875,264 A | 2/1999 | Carlstrom |
| 5,899,999 A | 5/1999 | De Bonet |
| 5,915,038 A | 6/1999 | Abdel-Mottaleb et al. |
| 5,918,223 A | 6/1999 | Blum et al. |
| 5,953,451 A | 9/1999 | Syeda-Mahmood |
| 5,983,351 A | 11/1999 | Glogau |

(Continued)

FOREIGN PATENT DOCUMENTS

CN    1279849 A    1/2001

(Continued)

OTHER PUBLICATIONS

Lin et al., "A Robust Image Authentication Method Distinguishing JPEG Compression from Malicious Manipulation", IEEE Transactions, Feb. 2001, vol. 11, No. 2, pp. 153-168.

(Continued)

*Primary Examiner*—Kambiz Zand
*Assistant Examiner*—Dant B Shaifer Harriman
(74) *Attorney, Agent, or Firm*—Lee & Hayes, PLLC

(57) ABSTRACT

Techniques are disclosed to provide randomized signal transforms and/or their applications. More particularly, a signal (e.g., an audio signal, an image, or a video signal) is transformed by applying randomly-selected basis functions to the signal. The applications of the randomized signal transforms include, but are not limited to, compression, denoising, hashing, identification, authentication, and data embedding (e.g., watermarking).

8 Claims, 10 Drawing Sheets

U.S. PATENT DOCUMENTS

| | | | |
|---|---|---|---|
| 6,075,875 A | 6/2000 | Gu | |
| 6,081,893 A | 6/2000 | Grawrock et al. | |
| 6,101,602 A | 8/2000 | Fridrich | |
| 6,131,162 A | 10/2000 | Yoshiura et al. | |
| 6,134,343 A | 10/2000 | Nichani | |
| 6,246,777 B1 | 6/2001 | Agarwal et al. | |
| 6,249,616 B1 | 6/2001 | Hashimoto | |
| 6,278,385 B1 | 8/2001 | Kondo et al. | |
| 6,314,192 B1 | 11/2001 | Chen et al. | |
| 6,321,232 B1 | 11/2001 | Syeda-Mahmood | |
| 6,330,672 B1 | 12/2001 | Shur | |
| 6,363,381 B1 | 3/2002 | Lee et al. | |
| 6,363,463 B1 | 3/2002 | Mattison | |
| 6,370,272 B1 | 4/2002 | Shimizu | |
| 6,377,965 B1 | 4/2002 | Hachamovitch et al. | |
| 6,385,329 B1 | 5/2002 | Sharma et al. | |
| 6,401,084 B1 | 6/2002 | Ortega et al. | |
| 6,418,430 B1 | 7/2002 | DeFazio et al. | |
| 6,425,082 B1* | 7/2002 | Matsui et al. | 713/176 |
| 6,477,276 B1 | 11/2002 | Inoue et al. | |
| 6,513,118 B1 | 1/2003 | Iwamura | |
| 6,522,767 B1 | 2/2003 | Moskowitz et al. | |
| 6,532,541 B1 | 3/2003 | Chang et al. | |
| 6,546,114 B1 | 4/2003 | Venkatesan et al. | |
| 6,574,348 B1 | 6/2003 | Venkatesan et al. | |
| 6,574,378 B1 | 6/2003 | Lim | |
| 6,584,465 B1 | 6/2003 | Zhu et al. | |
| 6,606,744 B1 | 8/2003 | Mikurak | |
| 6,625,295 B1 | 9/2003 | Wolfgang et al. | |
| 6,628,801 B2 | 9/2003 | Powell et al. | |
| 6,647,128 B1 | 11/2003 | Rhoads | |
| 6,654,740 B2 | 11/2003 | Tokuda et al. | |
| 6,658,423 B1 | 12/2003 | Pugh et al. | |
| 6,658,626 B1 | 12/2003 | Aiken | |
| 6,671,407 B1 | 12/2003 | Venkatesan et al. | |
| 6,674,861 B1 | 1/2004 | Xu et al. | |
| 6,687,416 B2 | 2/2004 | Wang | |
| 6,700,989 B1 | 3/2004 | Itoh et al. | |
| 6,701,014 B1 | 3/2004 | Syeda-Mahmood | |
| 6,725,372 B1 | 4/2004 | Lewis et al. | |
| 6,751,343 B1 | 6/2004 | Ferrell et al. | |
| 6,754,675 B2 | 6/2004 | Abdel-Mottaleb et al. | |
| 6,768,809 B2 | 7/2004 | Rhoads et al. | |
| 6,768,980 B1 | 7/2004 | Meyer et al. | |
| 6,769,061 B1 | 7/2004 | Ahern | |
| 6,771,268 B1 | 8/2004 | Crinon | |
| 6,782,361 B1 | 8/2004 | El-Maleh et al. | |
| 6,799,158 B2 | 9/2004 | Fischer et al. | |
| 6,839,673 B1 | 1/2005 | Choi et al. | |
| 6,864,897 B2 | 3/2005 | Brand | |
| 6,879,703 B2 | 4/2005 | Lin et al. | |
| 6,901,514 B1 | 5/2005 | Iu et al. | |
| 6,907,527 B1 | 6/2005 | Wu | |
| 6,965,898 B2 | 11/2005 | Aono et al. | |
| 6,971,013 B2 | 11/2005 | Mihcak et al. | |
| 6,973,574 B2 | 12/2005 | Mihcak et al. | |
| 6,990,444 B2 | 1/2006 | Hind et al. | |
| 6,990,453 B2 | 1/2006 | Wang et al. | |
| 6,996,273 B2 | 2/2006 | Mihcak et al. | |
| 7,007,166 B1* | 2/2006 | Moskowitz et al. | 713/176 |
| 7,062,419 B2 | 6/2006 | Grzeszczuk et al. | |
| 7,095,873 B2 | 8/2006 | Venkatesan et al. | |
| 7,142,675 B2* | 11/2006 | Cheng et al. | 380/46 |
| 7,171,339 B2 | 1/2007 | Repucci et al. | |
| 7,234,640 B2* | 6/2007 | Pentel | 235/384 |
| 2001/0010333 A1 | 8/2001 | Han et al. | |
| 2002/0126872 A1 | 9/2002 | Brunk et al. | |
| 2002/0154778 A1 | 10/2002 | Mihcak et al. | |
| 2002/0172394 A1 | 11/2002 | Venkatesan et al. | |
| 2002/0196976 A1 | 12/2002 | Mihcak et al. | |
| 2003/0056101 A1 | 3/2003 | Epstein | |
| 2003/0095685 A1 | 5/2003 | Tewfik et al. | |
| 2003/0118208 A1 | 6/2003 | Epstein | |
| 2003/0133591 A1 | 7/2003 | Watanabe et al. | |
| 2003/0169269 A1 | 9/2003 | Sasaki et al. | |
| 2003/0190054 A1 | 10/2003 | Troyansky et al. | |
| 2003/0219144 A1 | 11/2003 | Rhoads et al. | |
| 2004/0001605 A1 | 1/2004 | Venkatesan et al. | |
| 2004/0100473 A1 | 5/2004 | Grzeszczuk et al. | |
| 2004/0125983 A1 | 7/2004 | Reed et al. | |
| 2004/0249615 A1 | 12/2004 | Grzeszczuk et al. | |
| 2005/0015205 A1 | 1/2005 | Repucci et al. | |
| 2005/0065974 A1 | 3/2005 | Mihcak et al. | |
| 2005/0071377 A1 | 3/2005 | Mihcak et al. | |
| 2005/0076229 A1 | 4/2005 | Mihcak et al. | |
| 2005/0084103 A1 | 4/2005 | Mihcak et al. | |
| 2005/0163313 A1* | 7/2005 | Maitland et al. | 380/28 |
| 2005/0165690 A1 | 7/2005 | Liu et al. | |
| 2005/0180500 A1 | 8/2005 | Chiang et al. | |
| 2006/0274114 A1* | 12/2006 | Silverbrook et al. | 347/43 |
| 2007/0053325 A1* | 3/2007 | Shin et al. | 370/335 |

FOREIGN PATENT DOCUMENTS

| | | | |
|---|---|---|---|
| EP | 0581317 | 2/1994 | |
| EP | 1 253 784 | 10/2002 | |
| JP | 7239862 | 9/1995 | |
| JP | 11041571 | 2/1999 | |
| JP | 11098341 | 4/1999 | |
| JP | 11-041571 | * 12/1999 | |
| JP | 2000-004350 | 1/2000 | |
| JP | 2000050057 | 2/2000 | |
| JP | 2000115728 A | 4/2000 | |
| JP | 2000149004 | 5/2000 | |
| JP | 2000243067 A | 9/2000 | |
| JP | 2000261655 | 9/2000 | |
| JP | 2000332988 | 11/2000 | |
| JP | 2000350007 | 12/2000 | |
| RU | 2193825 C2 | 11/2002 | |
| WO | WO 99/17537 | 4/1999 | |
| WO | WO 99/18723 | 4/1999 | |
| WO | WO 99/60514 | 11/1999 | |
| WO | WO 01/11890 | 2/2001 | |
| WO | WO 01/28230 | 4/2001 | |
| WO | WO 02/37331 | 5/2002 | |
| WO | WO03092197 A1 | 11/2003 | |

OTHER PUBLICATIONS

Schneider et al., "A Robust Content Based Digital Signature for Image Authentication", Proceedings, International Conference, Sep. 1996, vol. 3, pp. 227-230.

F. A. P. Petitcolas and R. J. Anderson, "Evaluation of copyright marking systems," Proceedings of IEEE Multimedia Systems'99, vol. 1, pp. 574-579, Jun. 7-11, 1999, Florence, Italy.

I. J. Cox, J. Killian, T. Leighton, and T. Shamoon, "A secure robust watermark for multimedia," Information Hiding Workshop, University of Cambridge, pp. 185-206, 1996.

J. Dittman, M. Stabenau and R. Steinmetz, "Robust MPEG video watermarking technologies," Proceedings of ACM Multimedia '98, The 6th ACM International Multimedia Conference, Bristol, England, pp. 71-80.

M. D. Swanson, B. Zhu and B. Chau, "Object based transparent video watermarking," Proceedings of IEEE Signal Processing Society 1997 Workshop on Multimedia Signal Processing, Jun. 23-25, 1997, Princeton, New Jersey, USA.

M. K. Mihcak and R. Venkatesan, "A tool for robust audio information hiding: A perceptual audio hashing algorithm," submitted to Workshop on Information Hiding, Pittsburgh, PA, 2001.

T. Kalker and J. Haitsma, "Efficient detection of a spatial spread-spectrum watermark in MPEG video streams," Proc. IEEE ICIP, Vancouver, Canada, Sep. 2000.

B. Chen and G. W. Wornell, "Digital watermarking and information embedding using dither modulation," Proc. IEEE Workshop on Multimedia Signal Processing, Redondo Beach, CA, pp. 273-278, Dec. 1998.

Chang et al.,"RIME: A Replicated Image Detector for the World-Wide Web" Proceedings of the SPIE vol. 3527 Nov. 2-4, 1998 pp. 58-67.

Chen et al.,"Quantization Index Modulation Methods for Digital Watermarking and Information Embedding of Multimedia" Journal of VLSI Signal Processing 27 2001 pp. 7-33.

Chen et al.,"Achievable Performance of Digital Watermarking Systems" IEEE 1999 pp. 13-18.

Malvar,"A Modulated Complex Lapped Transform and its Applications to Audio Processing" IEEE ICASSP'99 Phoenix AZ. Mar. 1999 pp. 1-4.

Wu et al., Video Access Control Via Multi-level Data Hiding' Proc. IEEE Int. Conf. on Multimedia and Expo vol. I Jul./Aug. 2000 pp. 381-384.

Fridrich et al.,"Robust Hash Functions for Digital Watermarking" Proc. Int. Conf. on Information Technology: Coding and Computing Mar. 2000 pp. 178-183.

Lee et al., "Adaptive Video Watermarking Using Motion Information" Proc SPIE vol. 3971: Security and Watermarking of Multimedia Contents II Jan. 2000 pp. 209-216.

Echizen et al., "General Quality Maintenance Module for Motion Picture Watermarking" IEEE Trans. on Consumer Electronics vol. 45 No. 4. Nov. 1999 pp. 1150-1158.

Kesal, M. et al., "Iteratively Decodable Codes for Watermarking Applications," appeared in Proceedings of the 2nd Symposium on Turbo Codes and Their Applications, Brest, France, Sep. 2000, 4 pages.

Mihcak, M. Kivanc, et al., "New Iterative Geometric Methods for Robust Perceptual Image Hashing," appeared in Proceedings of the Security and Privacy Digital Rights Management Workshop, 2001, 9 pages.

Moulin, Pierre, et al., "The Parallel-Gaussian Watermarking Game," published in IEEE Transactions Information Theory, Feb. 2004, pp. 1-36.

Moulin, Pierre, et al., "A Framework for Evaluating the Data-Hiding Capacity of Image Sources," IEEE Transactions on Image Processing, Sep. 2002, vol. 11. No. 9, pp. 1-14.

Mihcak, M. Kivanc, et al., "Blind Image Watermarking Via Derivation and Quantization of Robust Semi-Global Statistics," appeared in Proceedings of IEEE-ICASSP, Orlando, FL, 2002, 4 pages.

Mihcak, M. Kivanc, et al., "Cryptanalysis of Discrete-Sequence Spread Spectrum Watermarks," appeared in Proceedings of the Information Hiding Workshop, Holland, 2002, 21 pages.

Mihcak, M. Kivanc, et al., "A Perceptual Audio Hashing Algorithm: A Tool for Robust Audio Identification and Information Hiding," appeared in the Proceedings of the Information Hiding Workshop, 2001, 15 pages.

Mihcak, M. Kivanc, et al., "Watermarking via Optimization Algorithms for Quantizing Randomized Statistics of Image Regions," appeared in the Proceedings of the Annual Allerton Conference on Communication, Control and Computing, Urbana, IL, 2002, 10 pages.

Venkatesan, Ramarathnam, et al., "Image Watermarking with Better Resilience," appeared in the Proceedings of IEEE-ICIP, Vancouver, BC, Canada, 2000, 4 pages.

Venkatesan, Ramarathnam, et al., "Robust Image Hashing," appeared in Proceedins of the IEEE-ICIP, Vancouver, BC, Canada, 2000, 3 pages.

Lambrou et al, "Classification of Audio Signals Using Statistical Features on Time and Wavelet Transform Domains", Accoustics, Speech and Signal Processing, 1998. Proceedings of the 1998 IEEE International Conference on Seattle, WA, USA May 12-15, 1998, New York, NY, USA, IEEE, US, vol. 6, pp. 3621-3624.

Moreno et al., "Using the Fisher Kernal Method for Web Audio Classification", Acoustics, Speech , and Signal Processing, 2000. ICASSP '00. Proceedings. 2000 IEEE International Conference on Jun. 5-9, 2000, Piscataway, NJ, USA, IEEE, vol. 6, pp. 2417-2420.

Pye, D., "Content-Based Methods for the Management of Digital Music", Acoustics, Speech , and Signal Processing, 2000. ICASSP '00. Proceedings. 2000 IEEE International Conference on Jun. 5-9, 2000, Piscataway, NJ, USA, IEEE, vol. 6, pp. 2437-2440.

Chang et al., "A Spatial Match Representation Scheme for Indexing and Querying in Iconic Image Databases", 1997, ACM, Retrieved from the Internet http://portal.acm.org/citation.cfm?id=266890&coll=ACM&dl=ACM&CFID=68519948&CFTOKEN=85922645.

El-Kwae et al., "Efficient Content-Based Indexing of Large Image Databases", Apr. 2000, ACM, Retrieved from the Internet: http://portal.acm.org/citation.cfm?id=348762&coll=ACM&dl=ACM&CFID=68519948&CFTOKEN=85922645.

Politis et al., "An Audio Signatures Indexing Scheme for Dynamic Content Multimedia Databases", Electrotechnical Conference, 2000 IEEE, vol. 2, May 29, 2000, pp. 725-728.

Schneider at al., "A Robust Content Based Digital Signature for Image Authentication", Proceedings, International Conference, Sep. 1996, vol. 3, pp. 227-230.

Venkatesan, et al., "Image Hashing", Microsoft Research, Mar. 24, 2000, pp. 1-8.

Cheng et al. "Aircraft identification based on the algebraic method" Hybrid Image and Signal Processing III, vol. 1702, Apr. 23, 1992, pp. 298-305.

Kozat S. S. et al., "Robust Precaptual Image Hashing Via Matrix Invariants" Image Processing, 2004. Oct. 24, 2004.

B. Chen and G. W. Wornell, "Quantization Index Modulation: A class of Provably Good Methods for Digital Watermarking and Information Embedding," IEEE Trans. Inform. Theory, 1999 and 2000, pp. 1-54.

B. Chen and G. W. Wornell, "Dither modulation: a new approach to digital watermarking and information embedding," Proc. of SPIE: Security and Watermarking of Multimedia Contents, vol. 3657, pp. 342-353, 1999.

Echizen, Isao et al., "General Quality Maintenance Module for Motion Picture Watermarking", IEEE Transactions on Consumer Electronics, vol. 45, No. 4, Nov. 1999, 9 pages.

Takeuchi, Kazuki et al., "Image ID Extraction by Content Analysis and its Applications", Nov. 24, 2000, 8 pages.

"The Singular Value Decomposition", at <<http://www2.imm.dtu.dk/~pch/Projekter/tsvd.html>>, Aug. 20, 1999, pp. 3.

Muramatsu, et al., "A Sound Database System with Intuitive Retrieval Retrieved by Sound", vol. 1999, No. 1, Mar. 25-28, 1999, The Institute of Electronics, Information and Communication Engineers, 1999, pp. 4.

Tsuji, et al., "Local Patterns of a Melody and its Applications to Retrieval by Sensitivity Words", IEICE Technical Report, Mar. 6, 1997, vol. 96, No. 565, pp. 17-24.

Yoshino et al., "An Automatic Metadata Creation Method for Music Data and its Application to Semantic Associative Search", Technical Report of Information Processing Society of Japan, Jul. 9, 1998, vol. 98 No. 58, pp. 109-116.

Dittmann, et al., "Content-based Digital Signature for Motion Pictures Authentication and Content-Fragile Watermarking", IEEE 1999, retrieved on Jul. 27, 2008 at <<http://ieeexplore.ieee.org/iel5/6322/16898/00778274.pdf?tp=&arnumber=778274&isnumber=16898>>, pp. 209-213.

Lin, et al., "Generating Robust Digital Signature for Image/Video Authentication", retrieved on Jul. 27, 2008 at <<http://www.ee.columbia.edu/In/dvmm/publications/98/acmmm98.pdf>>, Multimedia and Security Workshop at ACM Multimedia, '98, Bristol UK, Sep. 1998.

Brin, et al., "Copy Detection Mechanisms for Digital Documents", Proceedings of the ACM SIGMOD Annual Conference, San Jose, May 1995, pp. 398-409.

"US ASCII Code Chart", 1968, Wikipedia, 1 pg.

Kalker, et al., "A Video Watermarking System for Broadcast Monitoring" IS&T/SPIE Conference on Security and Watermarking of Multimedia Contents, SPIE vol. 3657, San Jose, CA, Jan. 1999, pp. 103-112.

Bebis et al., "Using Algebraic Functions of Views for Indexing-Based Object Recognition", Department of Computer Science, University of Nevada, Reno, NV, pp. 634-639.

Cooper et al., "Summarizing Popular Music Via Structural Similarity Analysis", 2003 IEEE Workshop on Applications of Signal Processing to Audio and Acoustics, Oct. 19-22, 2003, New Paltz, NY, 4 pgs.

Irons et al, "The Need of Perceptual Hashing Techniques for Music Scores", The Computer Society, Proceedings of the Third International Conference WEB Delivering of Music, 2003, IEEE, 4 pgs.

Liu et al., "A SVD-Based Watermarking Scheme for Protecting Rightful Ownership", IEEE Transaction on Multimedia, vol. 4, Issue 1, Mar. 2002, 25 pgs.

The Second Office Action for Chinese Patent Application No. 200510056235.3 dispatched on Feb. 12, 2010.

* cited by examiner

RANDOMIZED SIGNAL TRANSFORMS AND THEIR APPLICATIONS

TECHNICAL FIELD

The present invention generally relates to signal transforms, and more particularly, to randomized signal transforms and/or their applications.

BACKGROUND

As digital communication becomes more commonplace, the need for securing and/or authenticating the transferred digital data becomes increasingly more important. Digital signals carrying digital data is often (if not always) transformed into a specific format (e.g., by a transform) prior to being transferred. For example, a file containing digital data may be compressed prior to sending it over the Internet.

Since more powerful computers, high-speed Internet connections, and superior compression technologies are available to most users, the demand for digital media content is greater than ever. With instant and anytime access to literally millions of their favorite music and videos, consumers are applauding the convenience that digital distribution has afforded them. They enjoy being able to download or stream music to their hard drive or personal computer hard drive as fluidly as any television broadcast.

While the demand for digital content grows, however, so does the potential for its unauthorized use. Without a secure distribution system in place, digital media files can be easily copied or compressed into smaller files without the content owner's authorization. These files can then be transferred across the Internet for others to use or distribute freely. This violates the copyrights held by thousands of media companies, record labels, filmmakers, and recording artists. Such unauthorized use also strips these entities of valuable revenues as well.

One current approach is to encrypt the digital content to limit its unauthorized use. This approach, however, introduces additional overhead which can reduce the speed of systems utilizing signal transformation.

Accordingly, signal transformation solutions are desired which provide additional security while limiting performance degradation.

SUMMARY

Techniques are disclosed to provide randomized signal transforms and/or their applications. More particularly, a signal (e.g., an audio or video signal) is transformed by applying randomly-selected basis functions to the signal. The applications of the randomized signal transforms include, but are not limited to, compression, denoising, hashing, identification, authentication, and data embedding (e.g., watermarking).

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The following disclosure generally describes techniques for improving signal transformation. More specifically, a family of signal transforms, referred to herein as randlet transforms (RTs), are applied to signals (such as audio and/or video signals) to provide security, while maintaining reasonable performance. Each family member transform uses a set of basis functions (also referred to herein as "randlets") that are chosen randomly or pseudorandomly based on a secret key (K). In various described implementations, the application of RT can result in improved data embedding (e.g., watermarking), identification, authentication, hashing, denoising, and/or compression.

Overview of Randlet Transform

Figure 1:
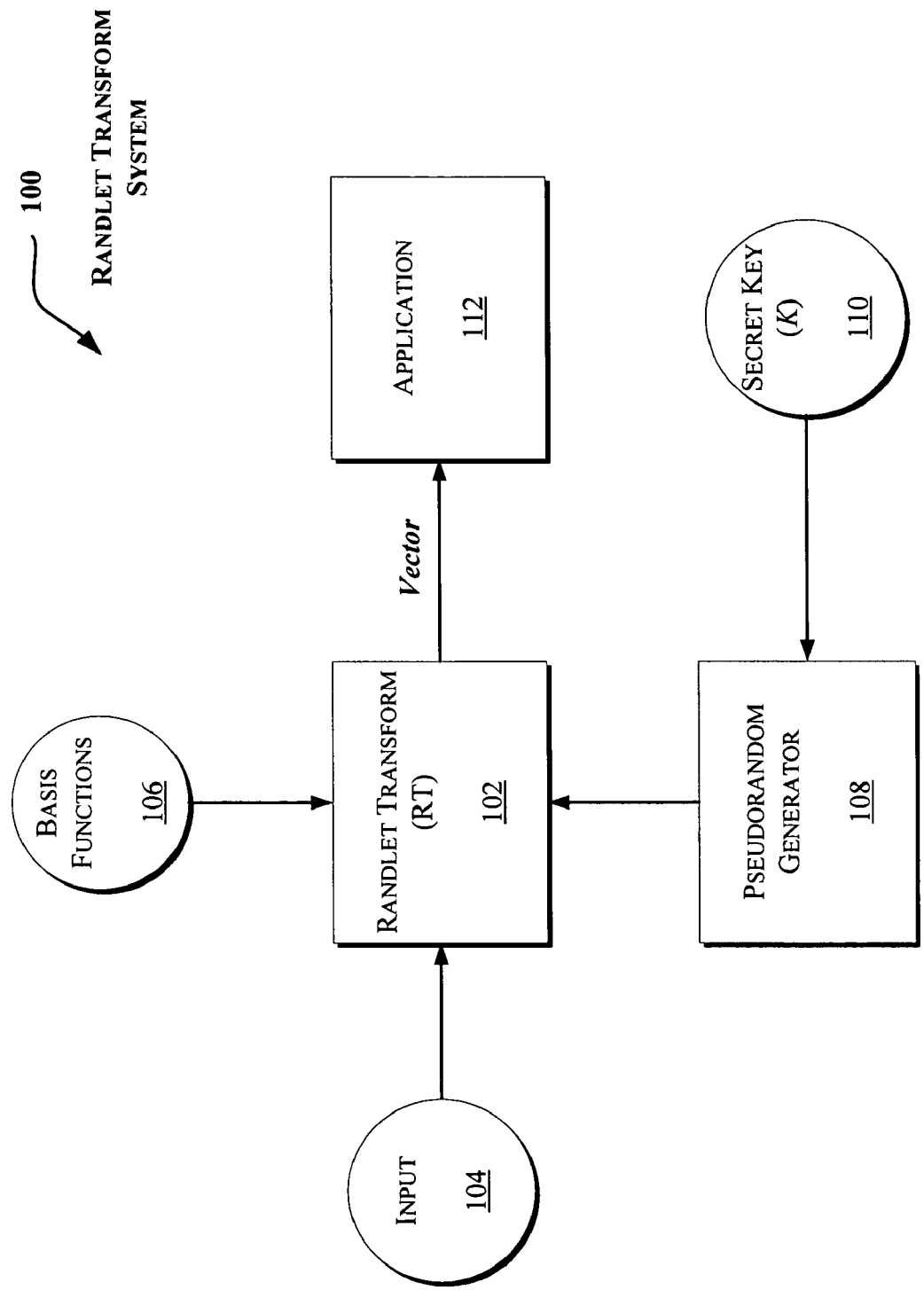
FIG. 1 illustrates an exemplary randlet transform (RT) system.

FIG. 1 illustrates an exemplary randlet transform (RT) system 100. An RT module 102 receives input data (104) such as an audio and/or video signal. The signal may be provided by a computer-readable medium, by a source connected to a computer network (e.g., an intranet, the Internet, a wireless network, etc.), and the like (as will be further discussed with reference to the computing environment of FIG. 11).

The RT module 102 transforms the input signal using a set of basis functions (106) that are selected randomly. The randomness is provided by a random number generated (or multiple random numbers generated) by a pseudorandom generator (108). In an implementation, the pseudorandom generator (108) is seeded by a secret key (K) (110). The secret key (K) may be provided as a bit stream. In one implementation, the generator 108 is a cryptologically-strong pseudorandom generator. The output of the RT module 102 (e.g., a vector) can be used for a number of applications (112), which will be further discussed, for example, with reference to FIGS. 6-10.

Figure 2:
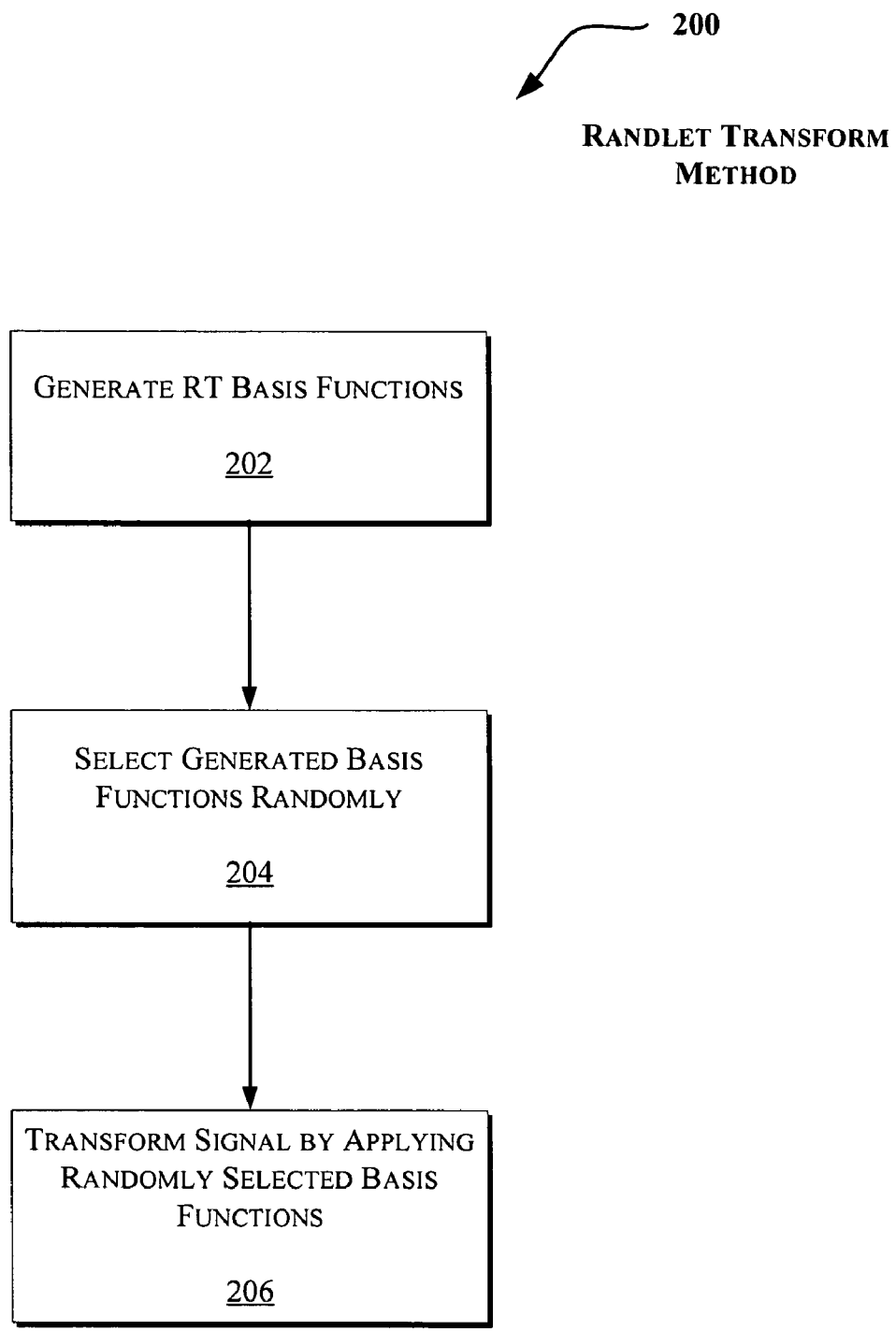
FIG. 2 illustrates an exemplary RT method.

FIG. 2 illustrates an exemplary RT method 200. After RT basis functions are generated (202) (as will be further discussed with reference to FIGS. 3 and 4), a number of the generated basis functions are selected at random (204) such as discussed with reference to FIG. 1. In an implementation, a secret key (K) (e.g., used as a seed for a pseudorandom number generator) specifies which basis functions should be selected for a particular instance. An input signal (104) is then transformed by applying the randomly selected basis functions (206). In an implementation, the input signal may be divided into blocks as will be further discussed with reference to FIG. 5, for example.

Moreover, the RT may be applied as a discrete transform. The provided randomness may give the RT two distinct advantages. First, it is useful for security purposes because an attacker cannot know which basis functions are used in the transform, making attacks relatively much more difficult. Second, because the basis is chosen at random from a relatively large set of basis functions, the worst-case performance of the transform occurs with relatively low probability. The measure for the RT is therefore the average-case performance rather than the worst-case performance.

Generating RT Basis

The basis functions (also referred to herein as "randlets") are based on a set of two-dimensional functions called "mother randlets." A variety of mother randlets are discussed below. It is envisioned that basis functions that are one-dimensional, two-dimensional, or three-dimensional (e.g., corresponding to audio signals, images, and video signals, respectively) may be utilized.

Figure 3:
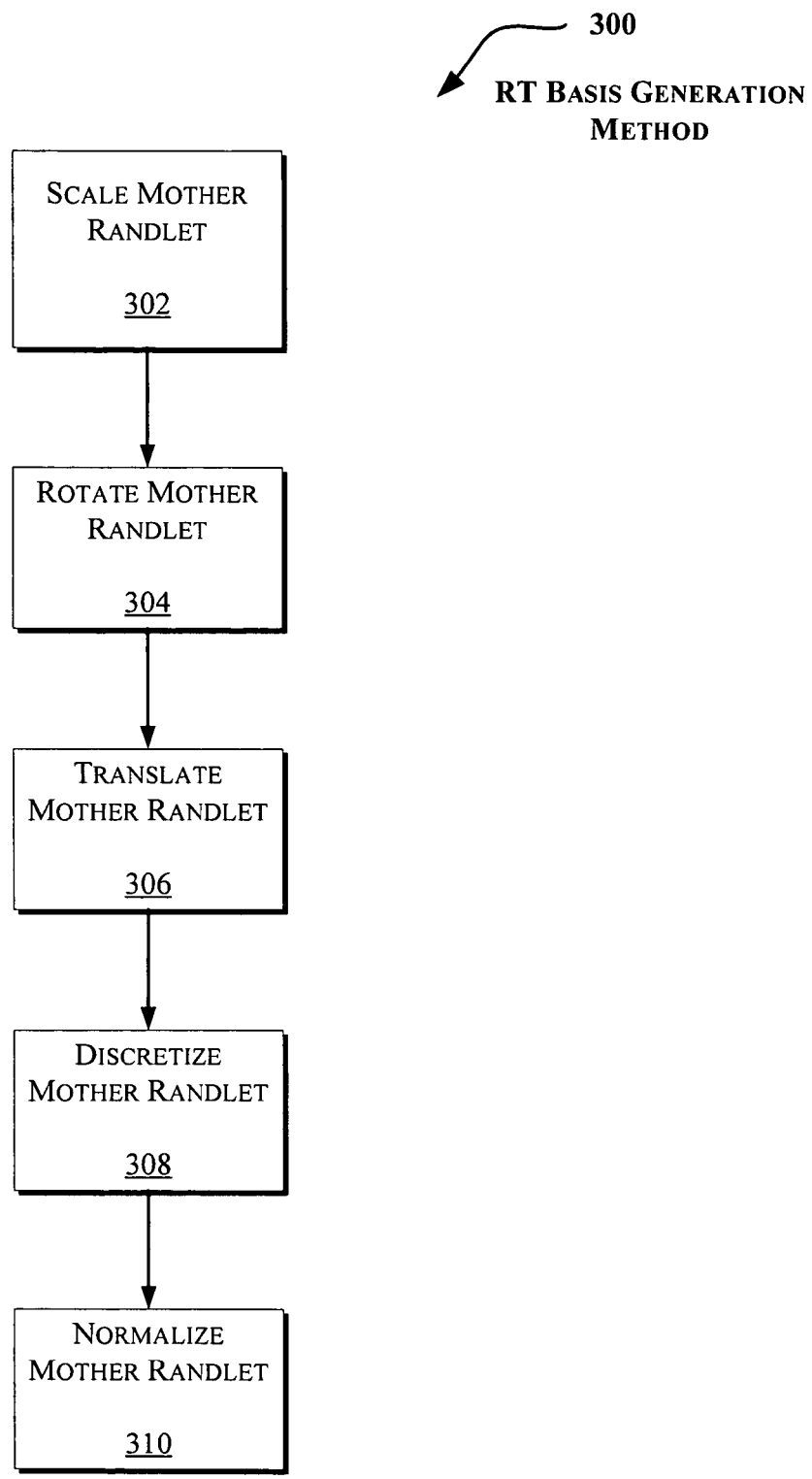
FIG. 3 illustrates an exemplary method for generating RT basis functions.

FIG. 3 illustrates an exemplary method 300 for generating RT basis functions. Generally, a randlet is produced by scaling (302), rotating (304), translating (306), discretizing (308), and normalizing (310) a mother randlet. Other orders of stages 302, 304, 306, and/or 308-310 are also envisioned. Furthermore, rotation may not be done for certain distributions such as symmetrical Gaussian distributions (i.e., rotation of a circle is not done).

In an implementation, given a mother randlet m(x,y), a randlet with horizontal translation a, vertical translation b, horizontal scaling $\alpha$, vertical scaling $\beta$, and rotation $\theta$ would be:

$$x[i, j] = \left(\frac{i}{\alpha}\cos\theta - \frac{j}{\beta}\sin\theta\right) - a$$

$$y[i, j] = \left(\frac{i}{\alpha}\sin\theta - \frac{j}{\beta}\cos\theta\right) - b$$

$$r[i, j] = K \square m(x[i, j], y[i, j])$$

Accordingly, to choose the specific randlets used in an instance of the RT, the secret key (K) is used to seed a pseudorandom number generator (such as 108 of FIG. 1). And, whenever a random number is needed, it is taken from this pseudorandom number generator.

Library of Basis Functions

Figure 4:
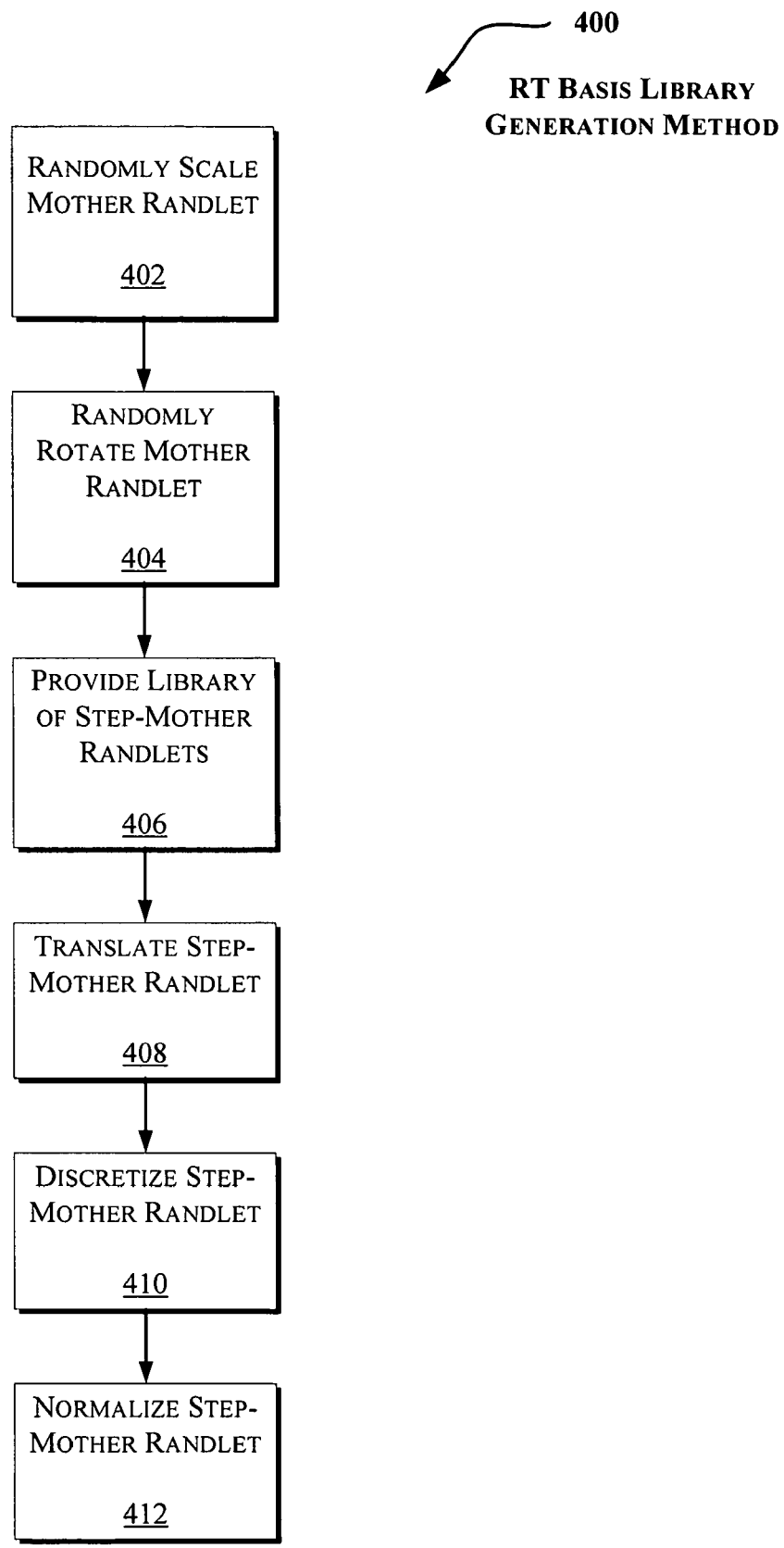
FIG. 4 illustrates an exemplary method for generating an RT basis functions library.

FIG. 4 illustrates an exemplary method 400 for generating an RT basis functions library. Generally, it is possible to define an RT basis by choosing all randlets independently and at random. In one implementation, however, this is unnecessary for practical reasons, as equal performance can be achieved by slightly constraining the choices of randlets. Furthermore, by limiting the choices of randlets, computational performance may be significantly improved.

In an implementation, the basis functions are constrained by allowing only a finite set of scaling and rotation operations, instead of choosing the scaling and rotation independently for each randlet. Instead of defining each randlet independently of all others, a random library of non-translated randlets is generated. These randlets are known as "step-mother randlets," and are generated by randomly scaling and rotating the mother randlets (402 and 404, respectively). This set of all step-mother randlets may be referred to as the "library" (406).

Each mother randlet is scaled randomly in both directions. The distributions for the scaling depend on both the specific mother randlet and the application. Examples are given in later sections. For each scaled mother randlet, the number of rotations generated may be proportional to the perimeter.

The step-mother randlets are translated (408), discretized (410), and normalized (412). Because a step-mother randlet is a discretized version of a mother randlet that has been scaled and rotated by real numbers, the normalization constant is determined by setting the inner product of the randlet with itself equal to 1. Hence:

$$\sum_{i=1}^{T}\sum_{j=1}^{U}(r_k[i,j])^2$$

$$K = \frac{1}{\sqrt{\sum_{i=1}^{T}\sum_{j=1}^{U}(m(x_k[i,j], y_k[i,j]))^2}}$$

Note that K depends on $\alpha$ and $\beta$.

The following several important values are parameters for the creation of an RT basis:

n: The total number of basis functions.

<T,U>: The width and height of the block to be transformed, respectively.

F(·): An algorithm which determines the type of each randlet.

The full set of randlets is generated by randomly choosing and translating (408) step-mother randlets from the library. This is done by generating a list of n 3-tuples, with each one representing one randlet that will be used in the transform: <i, a, b>. In the 3-tuples, i is in index to the library, and so implicitly determines the scaling and rotation of the randlet. i is chosen at random by the function F(·). The exact function F used depends on the application. a and b are the real-valued horizontal and vertical translation of center point of the randlet, chosen uniformly at random from [0,T] and [0,U], respectively. In an implementation, once the list has been generated, it is sorted according to the size of the randlets, e.g., with the largest randlets first and the smallest randlets last.

Mother Randlets

As discussed above, mother randlets are the base randlets from which all others are created as discussed with reference to FIG. 4. Mother randlets are two-dimensional real-valued functions with localized effective support, centered around (0,0). There are generally two types of mother randlets, low-frequency randlets and high-frequency randlets. Both types of randlets have a Gaussian shape in the horizontal direction. In the vertical direction, low-frequency randlets have a Gaussian shape while high-frequency randlets have an oscillatory shape. The only high-frequency randlet is also known as the Gaussian randlet. It is useful for finding low-frequency components of an image or audio content. It has a Gaussian shape in both the horizontal and vertical directions, although each direction can have different widths.

Gaussian Randlet:

$$m(x,y) = C\square e^{\sigma_x x^2 + \sigma_y y^2}$$

High-frequency randlets have a Gaussian shape in the horizontal direction and various oscillatory shapes in the vertical direction. Since they will be rotated, we refer to the smooth direction as the direction of the Gaussian, and the rough direction as the direction of the oscillatory function. The variations in the vertical direction give these randlets edge-detection properties in the horizontal direction. When rotated by $\theta$ degrees, they will tend to detect edges at $\theta$ degrees. Other types of randlets include:

Half Randlet:

$$m(x,y) = C\square y e^{\sigma_x x^2 + \sigma_y y^2}$$

Mexican Hat Randlet:

$$m(x,y) = C\square y^2 e^{\sigma_x x^2 + \sigma_y y^2}$$

Wavelet Randlet:

$$m(x,y)=C\Box w(y)e^{\alpha_x x^2}$$

The w(y) portion of the wavelet randlet is a one-dimensional wavelet function. In an implementation, when scaling a wavelet randlet, instead of choosing a wavelet of fixed size, a wavelet family can be chosen, and instead of scaling, a longer or shorter member of the wavelet family can be chosen.

Generally, high-frequency randlets are scaled so that the randlet is longer in the smooth direction than in the rough direction. This enhances the randlet's ability to detect edges.

In an implementation, the mother randlets may be obtained by combinations of the Gaussian, half, Mexican Hat, and/or wavelet randlets.

RT Transformation

Figure 5:
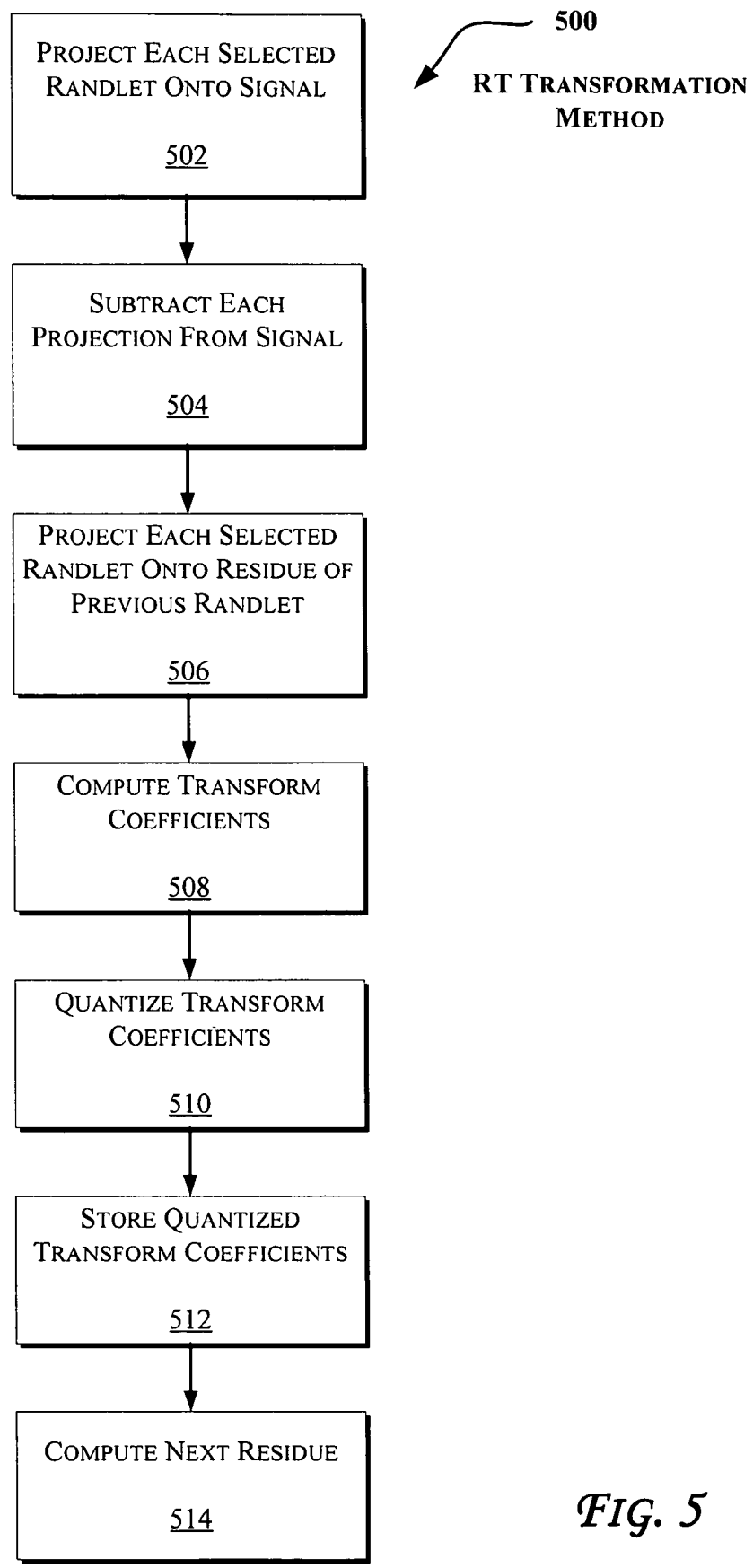
FIG. 5 illustrates an exemplary method for applying RT transformations.

FIG. 5 illustrates an exemplary method 500 for applying RT transformations. The transform is done by projecting each randlet onto the signal in turn (502). The randlets may be selected pseudorandomly (e.g., as discussed with reference to FIGS. 1-2). After each projection is taken, it is subtracted from the signal (504). What remains of the signal after the subtraction is called the "residue." The RT transformation method 500 continues by projecting each selected randlet onto the residue of the previous randlet (506). In this manner, the transform converges to the original signal, and the power of the coefficients tends to fall exponentially.

A transform coefficient k is computed (508) for each randlet by finding the inner product of randlet k and the residue of randlet k−1. If the randlet k is denoted by $r_k$, the residue of randlet m is denoted by $R_m$, and coefficient n is denoted by $c_n$, then:

$$c_k = \sum_{i=1}^{T} \sum_{j=1}^{U} R_{k-1}[i,j] \Box r_k[i,j]$$

As each coefficient is generated, it is quantized (510), and it is the quantized value that is stored (512) as the coefficient in the transform. In accordance with one implementation, it is also this quantized value that is subtracted from the signal (504). In an implementation, a uniform quantizer is used, basing the number of levels on type and scaling of the randlet. Randomized rounding may also be used, e.g., to round the coefficient based on a random number. The effects of randomized rounding may be accommodated by the iterative convergence of the algorithm.

Once the quantization is complete, the next residue is computed (514). If $Q(\cdot)$ is the quantizer, then:

$$R_k[i,j]=R_{k-1}[i,j]-Q(c_k)\Box r_k[i,j]$$

In an implementation, the randlets are not projected upon the entire signal block. The effective footprint of the randlets is computed in a preprocessing phase (not shown) by considering only the area where the randlets have non-negligible value. The randlets are then only projected in that area.

In an alternative implementation, the basis functions are placed as normal and then their positions are perturbed to the nearby location of maximum power. This makes the transform converge with fewer coefficients, but extra information would have to be stored with each coefficient giving the horizontal and vertical perturbation.

Since the center of each randlet ranges uniformly across the whole signal block, the extremities of the randlets can reach outside of the block. This causes edge effects at the block boundaries. These edge effects may be eliminated by padding each block with a mirror signal of itself at each edge. In general, a padding of 5 to 10 pixels (e.g., for an image) is sufficient, even for very large images.

Extending RT Transform

Generally, a specific instance of the RT is generated to work on a specific size of signal block (e.g., an image). There are three ways to do this. First, the randlets can be chosen with centers in the range [0,1], and the transform can be expanded to the actual size of whatever signal block is chosen. One advantage of this method is that many coefficients of the transform will become scaling-invariant. However, to ensure that this transform will scale well for large data blocks, an enormous number of randlets may need to be chosen. These randlets will be redundant on small signals, but necessary to enable the transform to be taken to large scales.

Another method is to define the transform for a maximum signal block size. This method is similar to the previous method, except that the number of basis functions can be bounded, since the maximum block size is known. There is still the problem of redundant basis functions on smaller blocks, though.

The third method is to generate the transform for a relatively small block, e.g. images of 50×50 or 100×100. Any block that is larger than this size is decomposed into blocks of this size, transform is performed separately on all blocks. This method may be beneficial for transforms, because it avoids the redundant basis functions of the previous two methods. However, the first method is useful for applications of the RT such as hashing and watermarking, where a small number of basis functions can be used. These are further discussed below under the same titles.

Furthermore, since most signal blocks will not come in integer multiples of the block size, the blocks may be padded with zero values to achieve a size that is a multiple of the block size. This padding may be removed as part of the inverse transform or reconstruction discussed below.

In one implementation, the basis functions need not be completely and independently random. For example, the first basis function may be chosen completely randomly. For each subsequent basis function, a set of linear constraints may be generated which include constraints that ensure orthogonality to all previously-chosen basis functions and/or normalization. Such constraints may also ensure that the shape of the basis function is a randlet. The next basis function may then be randomly chosen from the functions which fulfill the constraints. As additional basis functions are chosen, it may however become harder for functions to fulfill all of the constraints. In this situation, the next basis function may be chosen randomly from among the functions which approximately fulfill the constraints (e.g., almost orthogonal), such as defined by some threshold which may vary with the size of the desired basis function. In one implementation, this process can be implemented by an optimization algorithm.

Compression

Figure 6:
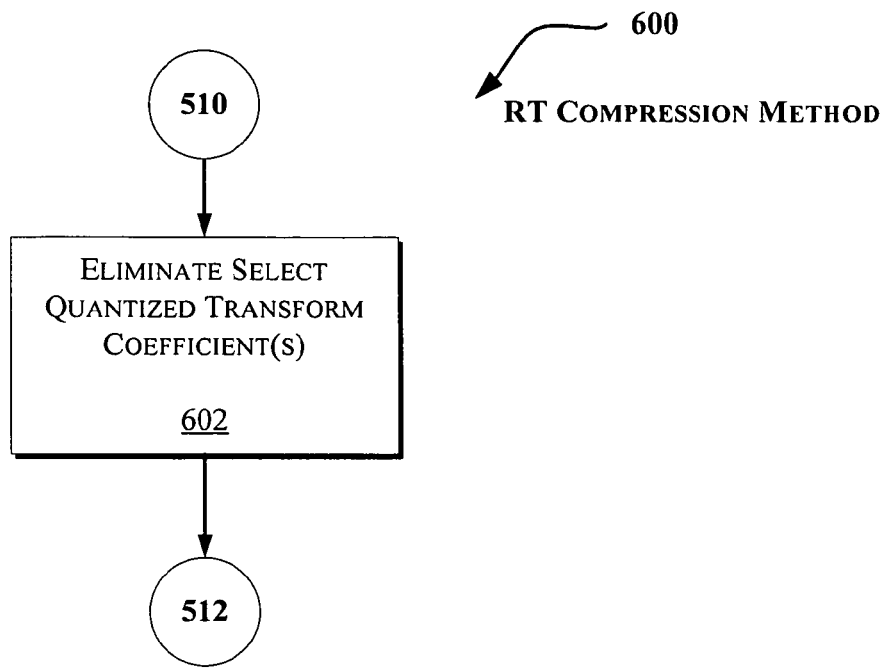
FIG. 6 illustrates an exemplary method for RT-based compression.

FIG. 6 illustrates an exemplary method 600 for RT-based compression. After quantization (e.g., stage 510 of FIG. 5), many of the transform coefficients may be zero. This distribution of coefficients lends itself very well to compression because these coefficients may be eliminated (602).

Moreover, lossy compression may be performed to an arbitrary level by throwing out coefficients corresponding to the smallest randlets (602). With respect to the sorted list of randlets discussed with reference to FIG. 4, lossy compression may be achieved by using only the randlets near the beginning of the list, ignoring the randlets at the end of the list. Other lossy compression techniques may also be utilized such as: (1) the coefficients can be compressed more harshly; and/ or (2) thresholds may be applied to the value of the coefficients, e.g., throwing out coefficients where the magnitude (e.g., absolute value) is below a certain threshold.

Furthermore, the rate of lossy compression can be varied dynamically as well, so the amount of bandwidth spent on a signal block is made accordingly to the bandwidth available. Also, an image can be sent iteratively so that the basic representation appears first, and the details are filled in later. Moreover, when the list of basis functions is sorted by size (as discussed with reference to FIG. 4), this happens automatically.

Denoising

Figure 7:
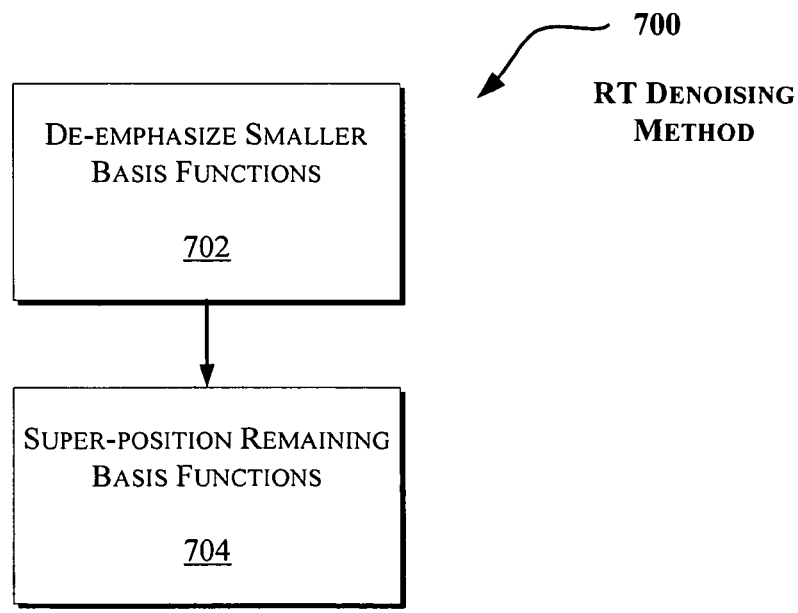
FIG. 7 illustrates an exemplary method for RT-based denoising.

FIG. 7 illustrates an exemplary method 700 for RT-based denoising. First, the small basis functions are de-emphasized (702). Then, the super-position of the remaining basis functions cancels out much of the noise (704).

Hashing

The RT is an ideal tool for multimedia signal hashing such as image hashing. Even though this section discusses image hashing specifically in portions, it is envisioned RT based hashing may be generally applied to signals as will be discussed with reference to FIG. 8.

With respect to image hashing, the generated hash value is believed to be robust to perturbations in the image, and the randomized nature of the basis functions ensures that the hash is hard to predict. A modified version of the RT of FIG. 5 may be used for hashing, because there are fewer requirements to hash than for the full transform. In particular, when using a transform to generate hash values, it is not necessary to be able to invert the hash values to produce the original signal. Therefore, many fewer coefficients are used when hashing than when performing a full image transform.

Additionally, when hashing, it may be valuable to have each coefficient taken from a same distribution as all of the other coefficients, when taken over all images, for example. Therefore, the use of residues is not done when the RT is used for hashing. This simplifies the hashing algorithm and ensures that the power of hash coefficients are not reduced by previous randlets. Also, when residues are taken, later coefficients depend on earlier coefficients, so a small perturbation in a signal can cause large changes in later coefficients. This is an undesirable property for an approximate hash.

In an implementation, the hashed vector can be quantized using a suitable lattice. For example, one can have a public key lattice for which a private key allows quantization easily, whereas quantization from the public key may introduce more errors. Accordingly, the public key basis would be the image of a private key basis for the lattice under a suitable unimodular matrix transformation. Moreover, the quantization also allows one to ignore small changes.

Figure 8:
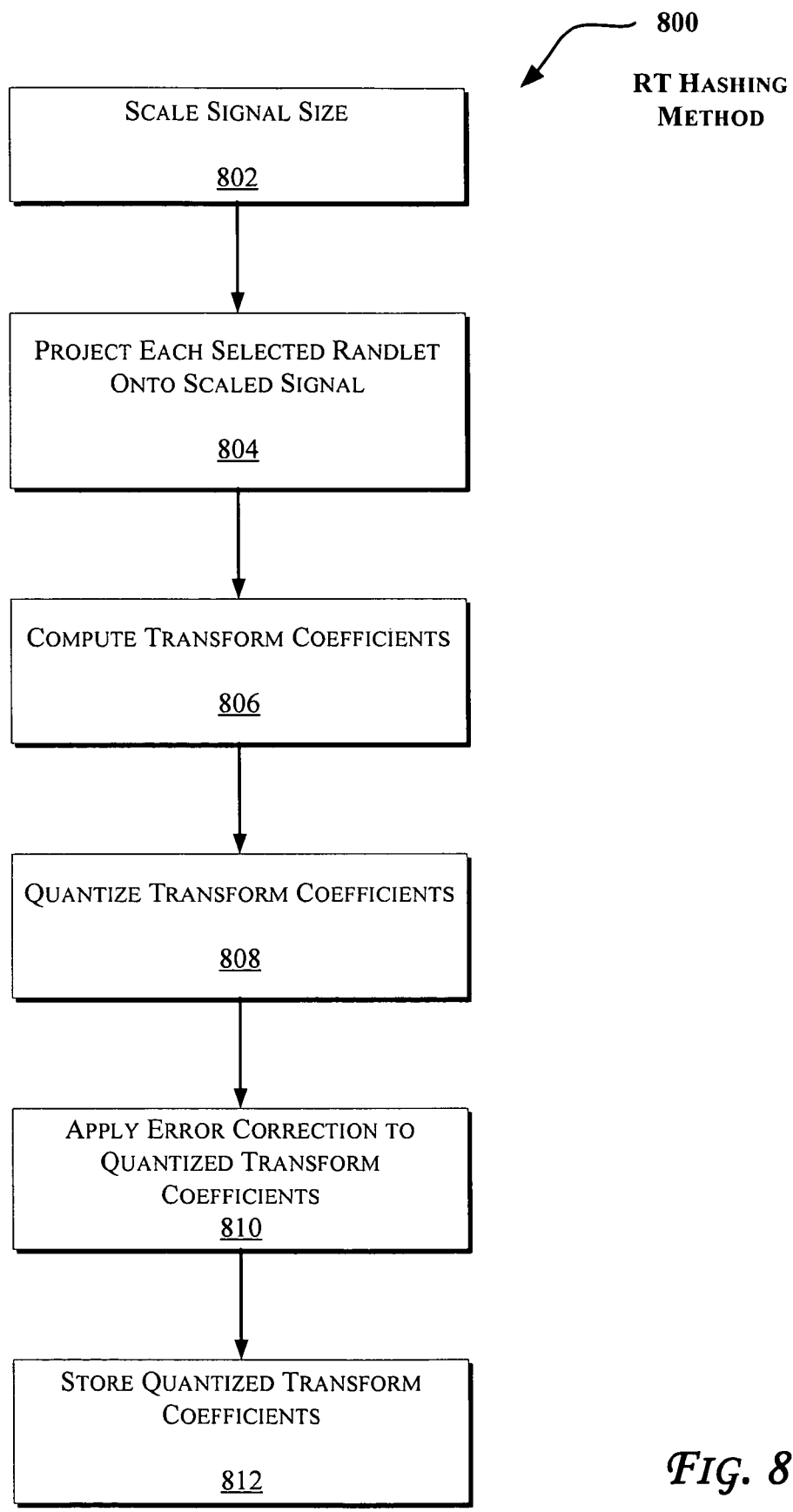
FIG. 8 illustrates an exemplary method for RT-based hashing.

Furthermore, when choosing a transform for a hash, the randlets do not have to be sorted by size (such as discussed with reference to FIG. 4). As illustrated in FIG. 8, an RT-based hashing is done by first scaling the signal to a set size (802), for example 256×256, and then projecting each of the selected randlets directly onto the signal (804), without using residues. The transform coefficients are computed (806) (as discussed with reference to FIG. 5). The coefficients that are produced are then (heavily) quantized (808).

Finally, error correction is applied to the quantized transform coefficients (810) and the coefficients are stored (812). In an implementation, an error-correcting code's decoder is used to shrink the hash value and make it even more resistant to perturbations.

Hashing for Identification/Authentication

Images (and signals generally) can be compared by performing an RT-based hashing (as discussed with reference to FIG. 8) and comparing the various hash values. However, for image identification or authentication, the error-correcting decoding is not necessary (810). As a result, each signal or image is associated with a vector of quantized transform coefficients. By comparing the vectors of coefficients based on a distance metric, signals can quickly be compared.

In an implementation, the $L_2$ norm is utilized. It is envisioned that the $L_n$ norm may produce better results, where n is large (since it magnifies large differences between coefficients while downplaying smaller differences).

Coefficients can be compared directly, or as ratios. For example, comparing the ratios of statistics in one image to the ratios of the same statistics in other images can help to defeat equalization attacks. This is similar to normalizing the transform coefficients. Alternately, statistics can be formed which are functions of subsets of coefficients. Again, these can be compared directly, or as ratios.

RT Watermarking

Figure 9:
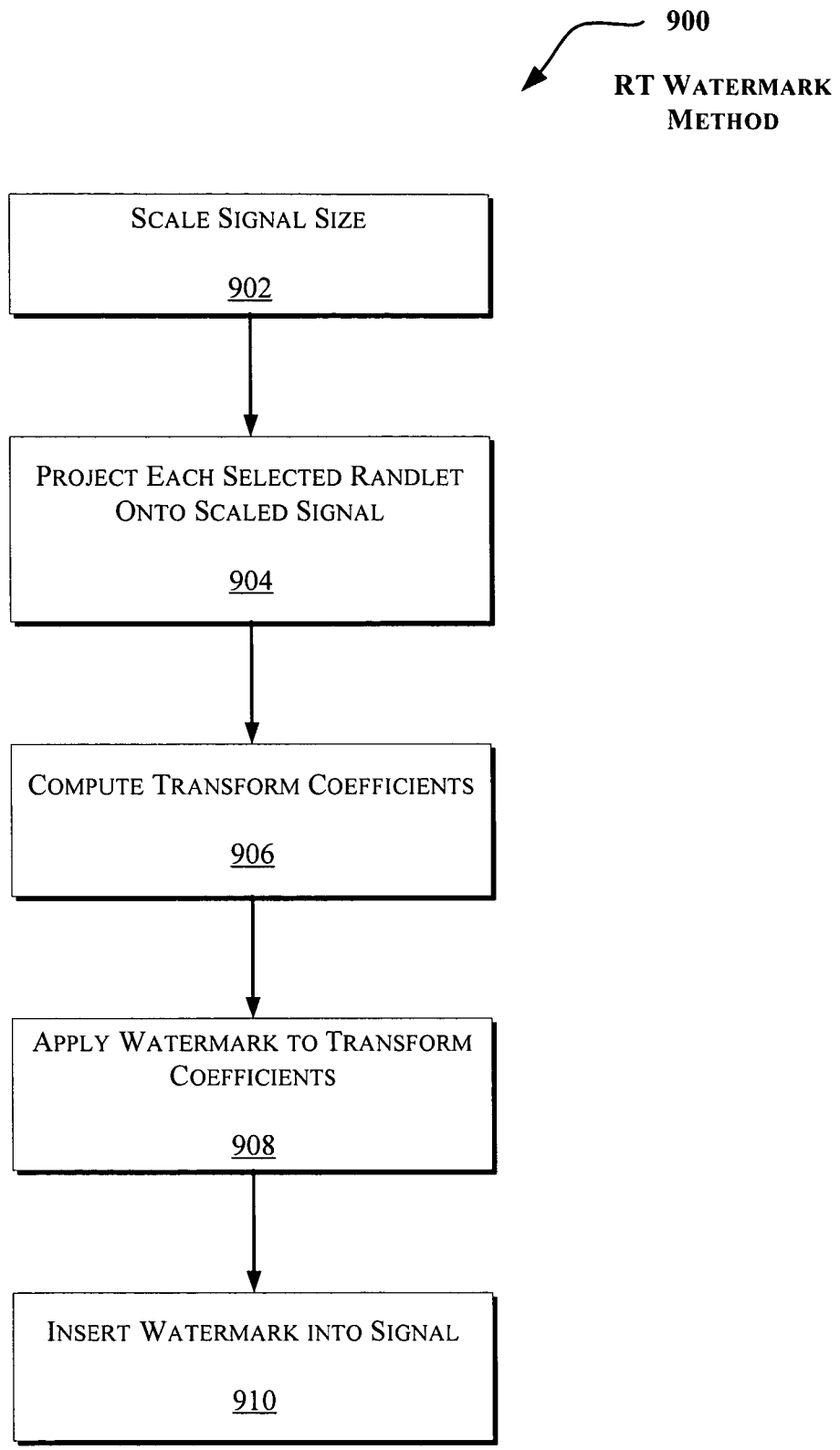
FIG. 9 illustrates an exemplary method for RT-based watermarking.

FIG. 9 illustrates an exemplary method 900 for RT-based watermarking. It is envisioned that the method 900 may more generally be utilized for data embedding. In watermarking (or more generally data embedding), the RT is defined for a relatively small number of unsorted randlets and no residues are taken, just like in RT-based hashing (see the discussion of FIG. 8 above). First, the signal size is scaled (902). For an image signal, the transform is defined on an image of canonical size, [0,1]×[0,1] and is scaled to the size of the image that is presented. The transform is performed by projecting the randlets directly onto the signal (904) and computing the transform coefficients (906) such as discussed with reference to FIGS. 5 and 8.

The watermark is then applied to the transform coefficients (908), which are inserted back into the signal (910), e.g., via a minimum-norm matrix solution to inverting the transform. To ensure that the matrix is well-behaved, the randlets may be chosen so that they do not substantially overlap. This may make it easier to identify and defeat the watermark, however.

Inverse Transform or Reconstruction

Figure 10:
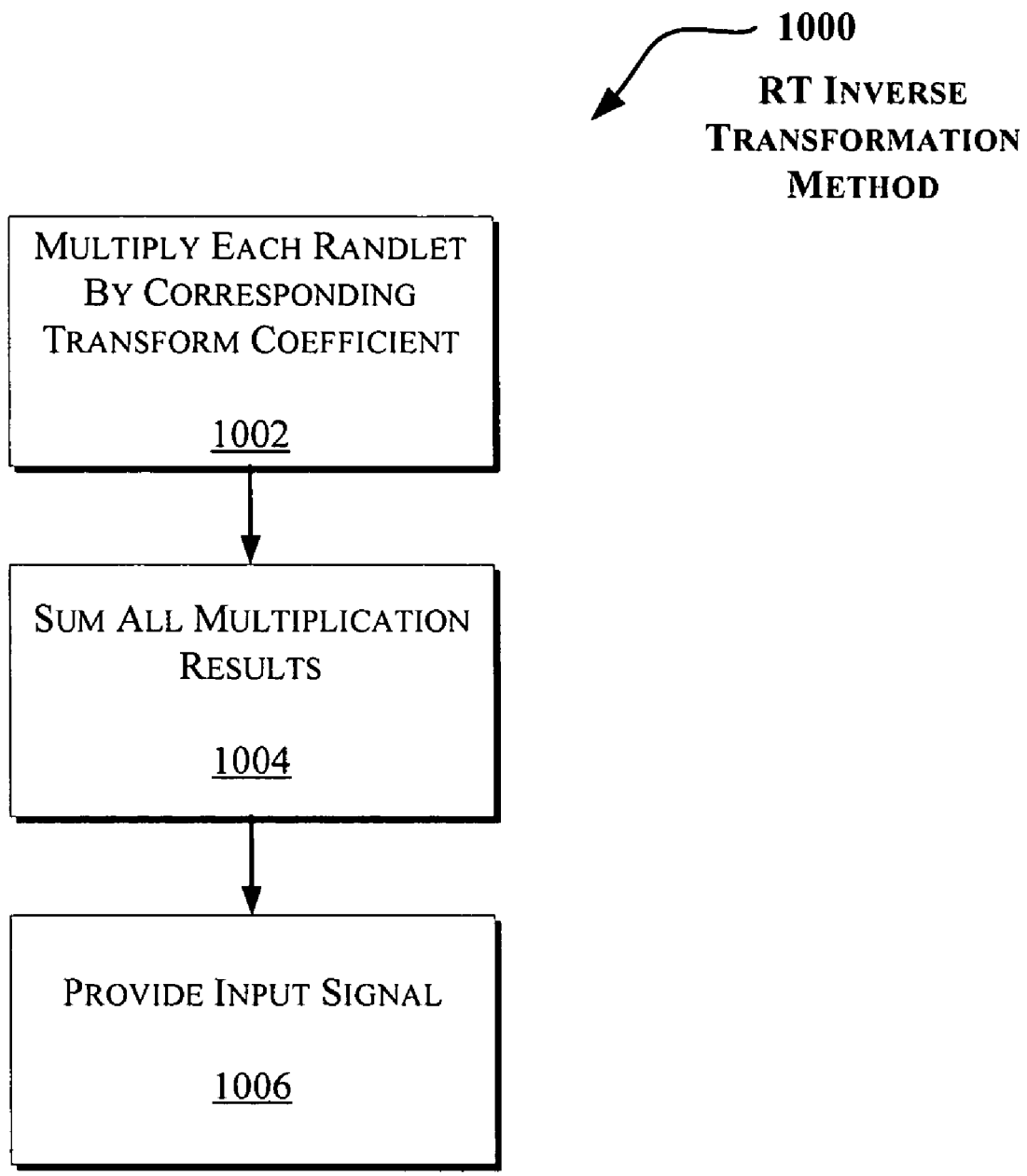
FIG. 10 illustrates an exemplary method for reconstruction of a signal transformed using RT.

FIG. 10 illustrates an exemplary method 1000 for reconstruction of a signal transformed using RT. Because residues are used when taking the transform (as discussed with reference to FIG. 5), the projection of each randlet is orthogonal to the previous randlets. This means that the original image can be reconstructed by simply adding up the projection of each randlet. That is, multiply each randlet by the corresponding transform coefficient (1002) and add them together (1004) to provide the input signal (1006).

For example, if I[i, j] is the image, then:

$$I[i, j] = \sum_{k=1}^{n} c_k \Box r_k[i, j]$$

In one implementation, the reconstruction method 1000 can be applied to almost-orthogonal basis functions. Accordingly, the reconstruction method 1000 may be applied when residues are used, when the basis functions are orthogonal, or when the basis functions are almost orthogonal.

Hardware Implementation

Figure 11:
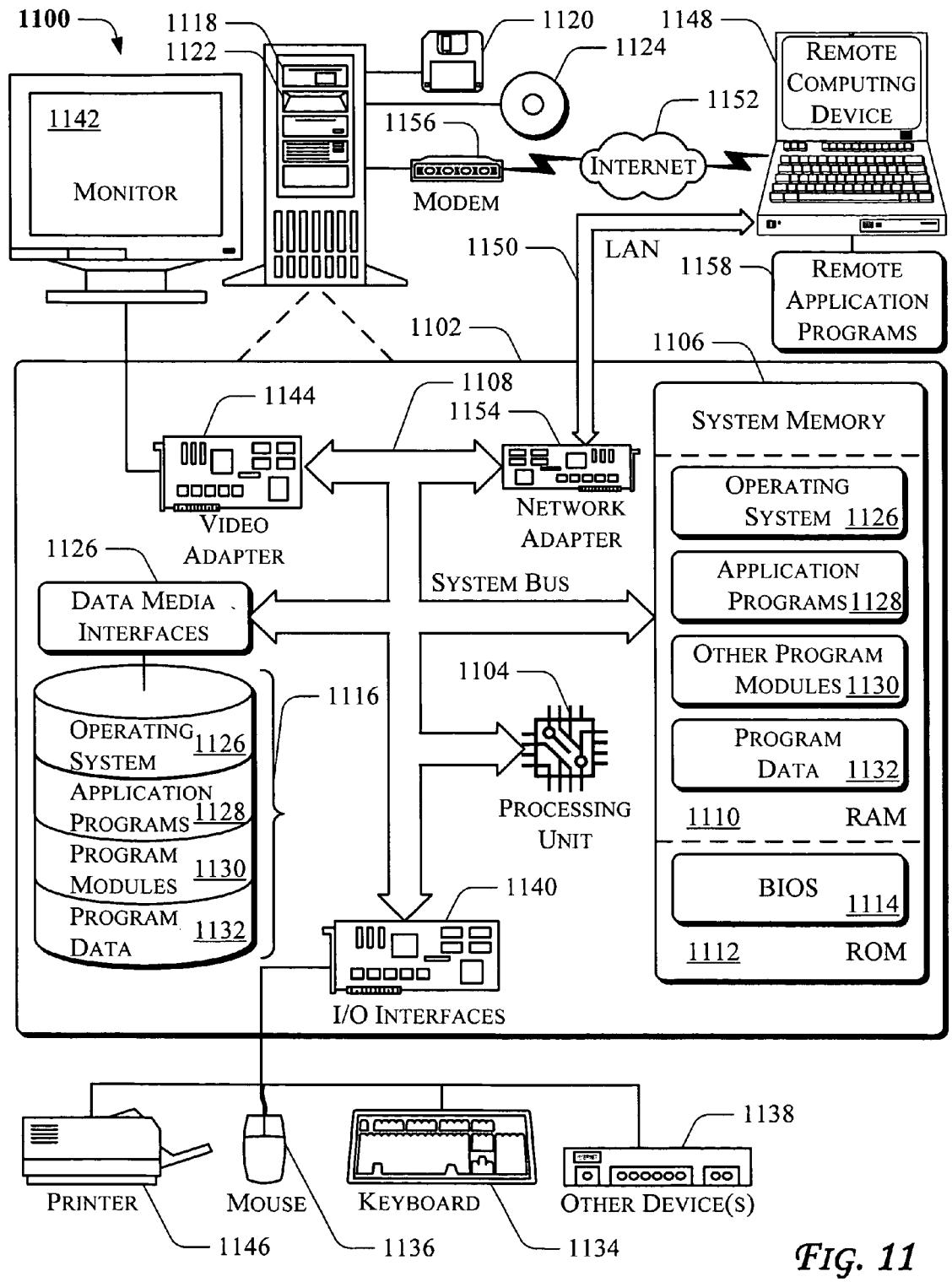
FIG. 11 illustrates a general computer environment 1100, which can be used to implement the techniques described herein.

FIG. 11 illustrates a general computer environment 1100, which can be used to implement the techniques described herein. For example, the computer environment 1100 may be utilized to execute instructions associated with performing the tasks discussed with reference to the previous figures. The computer environment 1100 is only one example of a computing environment and is not intended to suggest any limitation as to the scope of use or functionality of the computer and network architectures. Neither should the computer environment 1100 be interpreted as having any dependency or requirement relating to any one or combination of components illustrated in the exemplary computer environment 1100.

Computer environment 1100 includes a general-purpose computing device in the form of a computer 1102. The components of computer 1102 can include, but are not limited to, one or more processors or processing units 1104 (optionally including a cryptographic processor or co-processor), a system memory 1106, and a system bus 1108 that couples various system components including the processor 1104 to the system memory 1106.

The system bus 1108 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 1102 typically includes a variety of computer-readable media. Such media can be any available media that is accessible by computer 1102 and includes both volatile and non-volatile media, removable and non-removable media.

The system memory 1106 includes computer-readable media in the form of volatile memory, such as random access memory (RAM) 1110, and/or non-volatile memory, such as read only memory (ROM) 1112. A basic input/output system (BIOS) 1114, containing the basic routines that help to transfer information between elements within computer 1102, such as during start-up, is stored in ROM 1112. RAM 1110 typically contains data and/or program modules that are immediately accessible to and/or presently operated on by the processing unit 1104.

Computer 1102 may also include other removable/non-removable, volatile/non-volatile computer storage media. By way of example, FIG. 11 illustrates a hard disk drive 1116 for reading from and writing to a non-removable, non-volatile magnetic media (not shown), a magnetic disk drive 1118 for reading from and writing to a removable, non-volatile magnetic disk 1120 (e.g., a "floppy disk"), and an optical disk drive 1122 for reading from and/or writing to a removable, non-volatile optical disk 1124 such as a CD-ROM, DVD-ROM, or other optical media. The hard disk drive 1116, magnetic disk drive 1118, and optical disk drive 1122 are each connected to the system bus 1108 by one or more data media interfaces 1126. Alternatively, the hard disk drive 1116, magnetic disk drive 1118, and optical disk drive 1122 can be connected to the system bus 1108 by one or more interfaces (not shown).

The disk drives and their associated computer-readable media provide non-volatile storage of computer-readable instructions, data structures, program modules, and other data for computer 1102. Although the example illustrates a hard disk 1116, a removable magnetic disk 1120, and a removable optical disk 1124, it is to be appreciated that other types of computer-readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EE-PROM), and the like, can also be utilized to implement the exemplary computing system and environment.

Any number of program modules can be stored on the hard disk 1116, magnetic disk 1120, optical disk 1124, ROM 1112, and/or RAM 1110, including by way of example, an operating system 1126, one or more application programs 1128, other program modules 1130, and program data 1132. Each of such operating system 1126, one or more application programs 1128, other program modules 1130, and program data 1132 (or some combination thereof) may implement all or part of the resident components that support the distributed file system.

A user can enter commands and information into computer 1102 via input devices such as a keyboard 1134 and a pointing device 1136 (e.g., a "mouse"). Other input devices 1138 (not shown specifically) may include a microphone, joystick, game pad, satellite dish, serial port, scanner, and/or the like. These and other input devices are connected to the processing unit 1104 via input/output interfaces 1140 that are coupled to the system bus 1108, but may be connected by other interface and bus structures, such as a parallel port, game port, or a universal serial bus (USB).

A monitor 1142 or other type of display device can also be connected to the system bus 1108 via an interface, such as a video adapter 1144. In addition to the monitor 1142, other output peripheral devices can include components such as speakers (not shown) and a printer 1146 which can be connected to computer 1102 via the input/output interfaces 1140.

Computer 1102 can operate in a networked environment using logical connections to one or more remote computers, such as a remote computing device 1148. By way of example, the remote computing device 1148 can be a personal computer, portable computer, a server, a router, a network computer, a peer device or other common network node, game console, and the like. The remote computing device 1148 is illustrated as a portable computer that can include many or all of the elements and features described herein relative to computer 1102.

Logical connections between computer 1102 and the remote computer 1148 are depicted as a local area network (LAN) 1150 and a general wide area network (WAN) 1152. Such networking environments are commonplace in offices, enterprise-wide computer networks, intranets, and the Internet.

When implemented in a LAN networking environment, the computer 1102 is connected to a local network 1150 via a network interface or adapter 1154. When implemented in a WAN networking environment, the computer 1102 typically includes a modem 1156 or other means for establishing communications over the wide network 1152. The modem 1156, which can be internal or external to computer 1102, can be connected to the system bus 1108 via the input/output interfaces 1140 or other appropriate mechanisms. It is to be appreciated that the illustrated network connections are exemplary and that other means of establishing communication link(s) between the computers 1102 and 1148 can be employed.

In a networked environment, such as that illustrated with computing environment 1100, program modules depicted relative to the computer 1102, or portions thereof, may be stored in a remote memory storage device. By way of example, remote application programs 1158 reside on a memory device of remote computer 1148. For purposes of illustration, application programs and other executable program components such as the operating system are illustrated herein as discrete blocks, although it is recognized that such programs and components reside at various times in different storage components of the computing device 1102, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various implementations.

An implementation of these modules and techniques may be stored on some form of non transitory computer-readable media. Non-transitory computer-readable media can be any available media that can be accessed by a computer. By way of example, and not limitation, non transitory computer-readable media may comprise "non transitory computer storage media"

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, or magnetic disk storage or other magnetic storage devices.

"Communication media" typically includes computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared (IR), wireless fidelity (e.g., IEEE 802.11b wireless networking) (Wi-Fi), cellular, Bluetooth enabled, and other wireless media. Combinations of any of the above are also included within the scope of computer-readable media.

CONCLUSION

Although the invention has been described in language specific to structural features and/or methodological acts, it is to be understood that the invention defined in the appended claims is not necessarily limited to the specific features or acts described. For example, the techniques discussed herein may be applied to audio signals, images, and/or video signals (i.e., one, two, or three dimensional signals, respectively). Hence, the specific features and acts are disclosed as exemplary forms of implementing the claimed invention.

What is claimed is:

1. A method comprising:
    generating, by a computing device, a plurality of sets of basis functions, wherein each set of basis functions comprises a randlet transform, the plurality of sets of basis functions being generated based on a library of step-mother randlets, the step-mother randlets having in turn been generated from a mother randlet;
    randomly selecting, by the computing device, at least one set of basis functions from the plurality of sets of generated basis functions based on a secret key, the secret key being used to seed a pseudo-random number generator to generate a random number, the random number being used to randomly select the at least one set of basis functions;
    applying, by the computing device, the randomly selected set of basis functions to a signal; and
    in response to the applying, outputting, by the computing device, the signal which results from the applying, whereby the outputted signal facilitates applications of randomized signal transforms.

2. A method as recited by claim 1, wherein the basis functions are generated from a set of functions that are selected from one or more items of a group comprising two-dimensional and three-dimensional functions.

3. One or more non-transitory computer storage media having instructions stored thereon that, when executed, direct a machine to perform acts comprising:
    generating a plurality of sets of basis functions, wherein each set of basis functions comprises a randlet transform, the plurality of sets of basis functions being generated based on a library of step-mother randlets, the step-mother randlets having in turn been generated from a mother randlet;
    randomly selecting at least one set of basis functions from the plurality of sets of generated basis functions based on a secret key, the secret key being used to seed a pseudo-random number generator to generate a random number, the random number being used to randomly select the at least one set of basis functions;
    applying the randomly selected set of basis functions to a signal; and
    in response to the applying, outputting the signal which results from the applying, whereby the outputted signal facilitates applications of randomized signal transforms.

4. One or more non-transitory computer storage media as recited by claim 3, wherein the basis functions are generated from a set of functions that are selected from one or more items of a group comprising two-dimensional and three-dimensional functions.

5. A method as recited in claim 1 further comprising compressing the signal, wherein the applications of randomized signal transforms include at least one of compressing, denoising, hashing, identifying, authenticating, and watermarking.

6. A method as recited in claim 1, wherein the generating comprises randomly choosing a cardinality of the sets of basis functions to generate as part of the plurality of sets of basis functions.

7. A method as recited in claim 1, wherein the applying is characterized by applying the randomly selected set of basis functions to a signal as a discrete transform.

8. A method facilitating a transformation of a signal, the method comprising:
    generating, by a computing device, a plurality of sets of basis functions, wherein each set of basis functions comprises a randlet transform and the generating comprises randomly choosing a cardinality of the sets of basis functions to generate as part of the plurality of sets of basis functions, the plurality of sets of basis functions being generated based on a library of step-mother randlets, the step-mother randlets having in turn been generated from a mother randlet;
    randomly selecting, by the computing device, at least one set of basis functions from the plurality of sets of generated basis functions based on a secret key, the secret key being used to seed a pseudo-random number generator to generate a random number, the random number being used to randomly select the at least one set of basis functions;

applying, by the computing device, the randomly selected set of basis functions to a signal, wherein the applying is characterized by applying the randomly selected set of basis functions to the signal as a discrete transform; and in response to the applying, outputting, by the computing device, the signal which results from the applying, whereby the outputted signal facilitates applications of randomized signal transforms, which comprise compression, de-noising, hashing, identification, authentication, data embedding, and watermarking.

* * * * *